US008910130B2

(12) United States Patent
Münster et al.

(10) Patent No.: US 8,910,130 B2
(45) Date of Patent: Dec. 9, 2014

(54) METHOD AND SYSTEM FOR EXECUTING A 3GL PROGRAM AND/OR AN ASSEMBLER PROGRAM WITHIN A 4GL RUNTIME ENVIRONMENT

(75) Inventors: Michael Münster, Dreieich (DE); Uwe Henker, Reinheim (DE)

(73) Assignee: Software AG, Darmstadt (DE)

( * ) Notice: Subject to any disclaimer, the term of this patent is extended or adjusted under 35 U.S.C. 154(b) by 90 days.

(21) Appl. No.: 13/341,122

(22) Filed: Dec. 30, 2011

(65) Prior Publication Data
US 2013/0174130 A1 Jul. 4, 2013

(30) Foreign Application Priority Data
Dec. 29, 2011 (EP) ..................................... 11196078

(51) Int. Cl.
*G06F 9/45* (2006.01)
*G06F 9/30* (2006.01)
*G06F 9/40* (2006.01)
*G06F 9/44* (2006.01)
*G06F 7/04* (2006.01)
*G06F 15/16* (2006.01)
*G06F 17/30* (2006.01)

(52) U.S. Cl.
USPC ............. 717/136; 703/22; 712/209; 717/100; 717/106; 717/108; 717/115; 717/120; 717/137; 717/141; 717/142; 717/143; 726/7

(58) Field of Classification Search
CPC . G06F 17/3041; G06F 7/30566; G06F 1/362; G06F 1/3664; G06F 8/10; G06F 8/51
See application file for complete search history.

(56) References Cited

U.S. PATENT DOCUMENTS

| | | | | |
|---|---|---|---|---|
| 5,230,049 A | * | 7/1993 | Chang et al. ................... | 717/143 |
| 5,553,286 A | * | 9/1996 | Lee ................................ | 717/162 |
| 5,640,550 A | * | 6/1997 | Coker ........................... | 717/141 |
| 5,875,331 A | * | 2/1999 | Lindsey ........................ | 717/108 |
| 6,061,519 A | * | 5/2000 | Rathnam ...................... | 717/142 |
| 6,182,277 B1 | * | 1/2001 | DeGroot et al. .............. | 717/115 |

(Continued)

FOREIGN PATENT DOCUMENTS

| | | |
|---|---|---|
| EP | 0348563 | 1/1990 |
| EP | 0740250 | 10/1996 |

OTHER PUBLICATIONS

European Search Report issued in EP Appl 11196078 on May 11, 2012.

(Continued)

*Primary Examiner* — Don Wong
*Assistant Examiner* — Anibal Rivera
(74) *Attorney, Agent, or Firm* — Nixon & Vanderhye, P.C.

(57) ABSTRACT

Certain example embodiments transform a third-generation language (3GL) and/or an Assembler program so that it can be executed within a fourth-generation language (4GL) runtime environment. Certain example embodiments include a method for transforming a 3GL and/or an Assembler program that is callable by a 4GL program so that the 3GL and/or Assembler program is executable upon call by the 4GL program and from within a 4GL runtime environment. For instance a 4GL identifier may be included in the executable of the 3GL and/or the Assembler program to facilitate execution of the 3GL and/or the Assembler program upon call of the fourth-generation language (4GL) program and within the 4GL runtime environment.

23 Claims, 11 Drawing Sheets

(56) References Cited

U.S. PATENT DOCUMENTS

Figure 1:
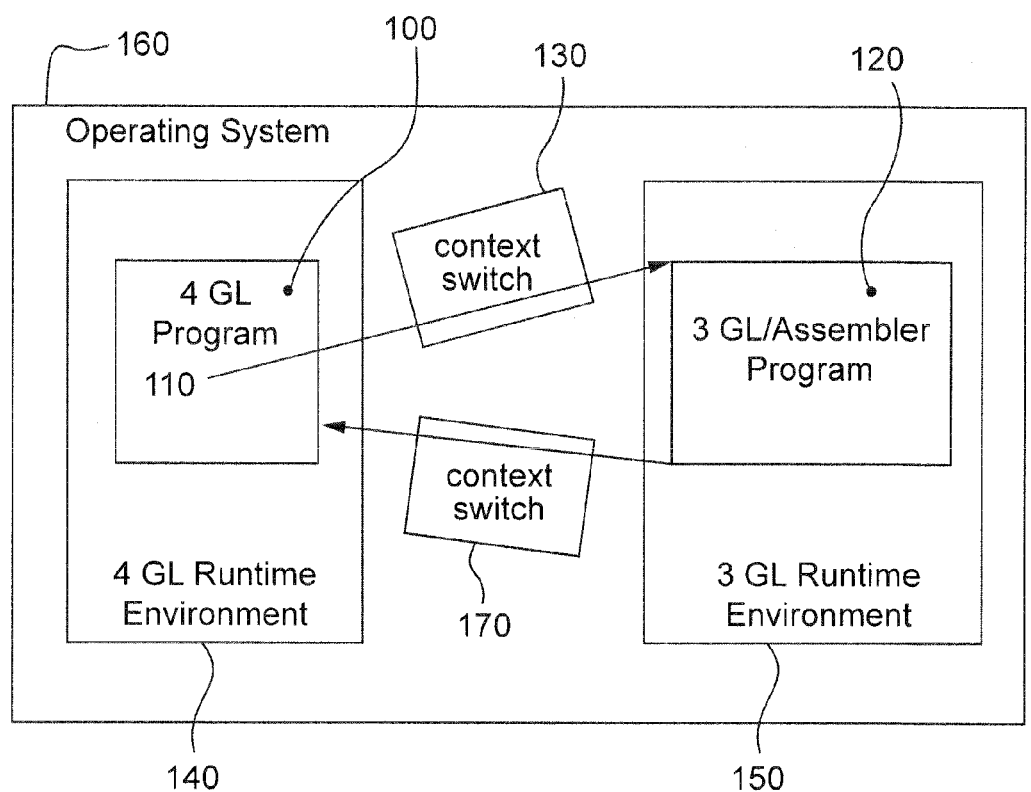

| | | | |
|---|---|---|---|
| 6,484,309 B2 * | 11/2002 | Nowlin et al. | 717/100 |
| 2001/0011371 A1 * | 8/2001 | Tang | 717/9 |
| 2002/0199174 A1 | 12/2002 | Tapperson | |
| 2004/0015834 A1 * | 1/2004 | Mestre et al. | 717/106 |
| 2006/0031820 A1 * | 2/2006 | Li | 717/137 |
| 2008/0059769 A1 * | 3/2008 | Rymarczyk et al. | 712/209 |
| 2008/0307392 A1 * | 12/2008 | Racca et al. | 717/120 |
| 2011/0035205 A1 * | 2/2011 | Brideson et al. | 703/22 |
| 2012/0110652 A1 * | 5/2012 | Brown et al. | 726/7 |

OTHER PUBLICATIONS

Agner Fog, Instructions for objconv.Version 2.10 ("cof2elf.cpp"), Jul. 24, 2011, pp. 1-35, XP002675842 [retrieved May 9, 2012] URL:http://web.archive.org/web/20110724225859/http://www.agner.org/optimize/objconv. zip.

Agner Fog, "elf2cof.cpp", Jul. 24, 2011, pp. 1-10, XP002677278 [retrieved May 9, 2012] URL:http://web.archive.org/web/20110724225859/http://www.agner.org/optimize/objconv. zip.

Agner Fog, "cof2omf.cpp", Jul. 24, 2011, pp. 1-8, XP002677279 [retrieved May 9, 2012] URL:http://web.archive.org/web/20110724225859/http://www.agner.org/optimize/objconv.zip.

Agner Fog, "omf2coff.cpp", Jul. 24, 2011, pp. 1-10, XP002677280 [retrieved May 9, 2012] URL:http://web.archive.org/web/20110724225859/http://www.agner.org/optimize/objconv. zip.

Agner Fog, "omf2cof", Jul. 24, 2011, pp. 1-11, XP002677281 [retrieved Jul. 24, 2011] URL:http://web.archive.org/web/20110724225859/http://www.agner.org/optimize/objconv. zip.

* cited by examiner

METHOD AND SYSTEM FOR EXECUTING A 3GL PROGRAM AND/OR AN ASSEMBLER PROGRAM WITHIN A 4GL RUNTIME ENVIRONMENT

This application claims priority to EP 11 196 078.7, filed Dec. 29, 2011, the entire contents of each of which are hereby incorporated by reference.

1. TECHNICAL FIELD

The present invention relates to a method and system for executing a 3GL and/or an Assembler program within a 4GL runtime environment.

2. TECHNICAL BACKGROUND

Modern software projects typically comprise multiple programs interacting with each other. Typically, the programs are written in different programming languages, e.g., Natural, C++ or Assembler. For instance, the core functionality of a complex program which is used for monitoring technical processes such as the operation of a brake of a car may be created using a programming language specifically designed for this purpose. Related tasks, for example the presentation of a display about the braking action are then performed by programs which are called as required and which could be realized in another programming language.

Another example of such a scenario is a complex monitoring program which communicates with a database in order to obtain certain data. However, the program does not instruct the database how this data has to be obtained. The actual steps of obtaining data from the database could then be achieved by using another program written in another programming language. As another example, an Assembler program can provide the functionality for working with client certificates when calling web services from the underlying core program.

In other words, while the core functionality defines what has to be done in order to solve a certain task, it does not specify the exact steps necessary for solving the problem. It describes the problem from a highly abstract level.

Such high-level programming languages may be referred to as fourth generation languages, or short as 4GL. A Fourth Generation Language provides a compiler, interpreter and runtime environment to execute 4GL programs. 4GLs, in general, provide better abstraction from the underlying hardware, operating system and other computer specifics, thus providing better independence from the computer system used. Examples for fourth generation languages are Natural which is available from applicant, SQL or ABAP.

Programs that are typically used for executing specific tasks necessary for solving a problem are usually referred to as third generation languages, or short as 3GL. A Third Generation Language provides a compiler to create executable files directly from source code, avoiding the cumbersome Assembler programming. The 3GL program usually needs to manage its own memory space and interaction with the operating system or hardware to a certain degree directly. Examples for such third generation languages are Fortran, C++, COBOL, PLI or Java.

As mentioned, such programs are called by the core program, i.e., the 4GL software, as needed. However, programs created in different programming languages may also require different runtime environments as will be explained with reference to FIG. 1. Runtime environments 140, 150 provide a program with functions necessary for running on a certain operating system 160. In other words, programs may need a specific runtime environment.

Thus, when a core program such as a 4GL program 100 invokes 110 another program such as a 3GL or Assembler program 120 with a command (e.g., a CALL statement), a change of the runtime environment is necessary. This change typically requires a context switch 130 from the 4GL runtime environment 140 to, e.g., the 3GL runtime environment 150. Such context switch 130 requires saving the current state of the running program 100 (e.g., the core program created in 4GL) in the current runtime environment 140, locating and loading the called program (e.g., a 3GL or an Assembler program) 120, initializing the appropriate called runtime environment 150, providing suitable parameters to the called runtime environment 150 and activating the called runtime environment 150.

It is apparent that such a process is very complex, time consuming, increases the overhead and therefore reduces the performance. This is to even more the case since a similar process 170 has to be performed when returning to the original program 100.

It is therefore the technical problem underlying the present invention to improve the present methods for calling and executing programs from an originating program, wherein the called program requires another runtime environment, thereby overcoming the problems of the prior art at least in part.

3. SUMMARY OF THE INVENTION

In one embodiment this problem is solved by independent claim 1 which relates to a method for transforming a 3GL and/or an Assembler program so that it can be executed within a 4GL runtime environment, the method comprising the step of including a 4GL identifier in the executable of the 3GL and/or the Assembler program.

The described solution significantly reduces the overhead of known approaches. In detail, by transforming a 3GL and/or Assembler program so that it can be executed within a 4GL runtime environment, the steps necessary to change the runtime environment become obsolete. In more detail, saving the current state of the running program in the current runtime environment, locating and loading the called program, initializing the appropriate called runtime environment, providing suitable parameters to the called runtime environment and activating the called runtime environment as known from prior art is no longer needed.

Instead, the executable of the program which is to be called is simply transformed. By including a 4GL identifier, a recompilation of the 3GL and/or Assembler program can be avoided.

Moreover, context switches are avoided and valuable computing resources can be saved. When the 4GL runtime environment fetches the to transformed 3GL and/or Assembler program as a 4GL object type, it may directly execute the program under the control of the 4GL runtime environment. Thus, when the transformed 3GL and/or Assembler program finishes, the execution of the calling 4GL program can be continued without changing the runtime environment, i.e., again without context switch.

In a preferred embodiment the identifier is a 4GL program header.

Depending on the respective 4GL used, the identifiers may have different requirements. In case of Natural, a specific 4GL program header may be used for the transformation of the 3GL and/or Assembler program.

Preferably, the executable of the transformed 3GL and/or the Assembler program further comprises a relocation stub routine.

The relocation stub routine is used for resolving any dependencies in the 3GL and/or Assembler program (e.g., constants in the memory) which require modification so that the transformed 3GL and/or Assembler programs runs properly when called by the 4GL application.

Preferably, the method further comprises the step of checking whether a table of relocation dictionary, TRLD, exists in the executable.

A table of relocation dictionary (TRLD) contains an entry for each address constant (A-constants for entry points inside the 3GL and/or Assembler programs and/or resolved and unresolved V-constants) that must be relocated and/or resolved before a program is executed. If these constants are not adjusted, relocation stub issues can occur, in particular when multiple entry points in the executable of the 3GL and/or Assembler program exist. As a consequence, the program could crash. Therefore, by modifying the TRLD, relocation stub issues can be avoided which improves the stability of the program.

It is further preferred that the method comprises the step of locking the 3GL and/or the Assembler program and the step of relocating A- and/or V-constants in the TRLD.

Locking the 3GL and/or Assembler executable allows a transformation of the executable. Without locking the executable that is to be transformed, the program could crash. A-constants are comprised in the TRLD and may comprise an offset inside the transformed 3GL program. V-constants are similar to A-constants, but usually relate to addresses external to the 3GL and/or Assembler program that are to be called. Thus, by modifying the offset, the one or more entry points in the executable can be adjusted, so that the program runs more stable and without the risk of crashing.

It is also preferred that the method further comprises the step of replacing the value of one or more unresolved V-constants using the relocation stub routine.

V-constants are similar to A-constants, but usually relate to addresses external to the 3GL and/or Assembler program that are to be called. For instance, the unresolved V-constants may be replaced with resolved entries by using the relocation stub routine. Resolving issues with the V-constants makes the transformed program more stable when executed.

Preferably, the transformed 3GL and/or Assembler programs are marked as 4GL executable code.

This allows for identification of the executable as 4GL executable code. Therefore, it can easily be determined whether a certain 3GL and/or Assembler executable has already been transformed or not. In Natural of applicant, the marked executable code is called Natural Optimized Code.

It is also preferred that the method comprises the step of modifying the to call statement of a 4GL program which calls the transformed 3GL and/or Assembler program.

By modifying the existing call statement in the 4GL source code for invoking the 3GL and/or Assembler program, the invocation can be improved, e.g., by using and/or forwarding specific parameters. Thereby, modifying custom 4GL programs becomes possible.

Preferably, the method comprises the step of preloading the transformed 3GL and/or Assembler program into a 4GL program cache.

Preloading the transformed program accelerates the execution of the program. The time necessary to load and execute a program after invocation can be reduced. Preloading the program would not be possible without the transformation of the 3GL and/or Assembler program.

It is preferred that the method comprises the step of relocating the transformed 3GL and/or Assembler program in the 4GL program store area.

Relocating the transformed 3GL and/or Assembler program into the 4GL program area improves the efficiency of invocation of the transformed program. For instance, the program no longer needs to be located but is already present in the storage area.

In an embodiment, the invention comprises a computer program comprising instructions for performing any of the embodiments described herein.

The method described herein can be realized by a software tool, which allows the user to transform existing 3GL and/or Assembler programs. Furthermore, the software tool may allow the user to modify the 4GL-code. The software tool may manage all or a part of the above mentioned to features. However, the functionality may also be split between several programs.

Preferably, the invention comprises a system adapted to transform a 3GL and/or an Assembler program so that it can be executed within a 4GL runtime environment, wherein the system comprises transformation means adapted to include a 4GL identifier in the executable of the 3GL and/or the Assembler program.

In a preferred embodiment, the runtime environment employs an underlying zIIP processor.

The zIIP processors are particularly powerful at running 4GL programs which may require a switch to 3GL and/or Assembler programs.

Further preferred embodiments of the present invention are described in the detailed description.

4. SHORT DESCRIPTION OF THE FIGURES

Figure 2:
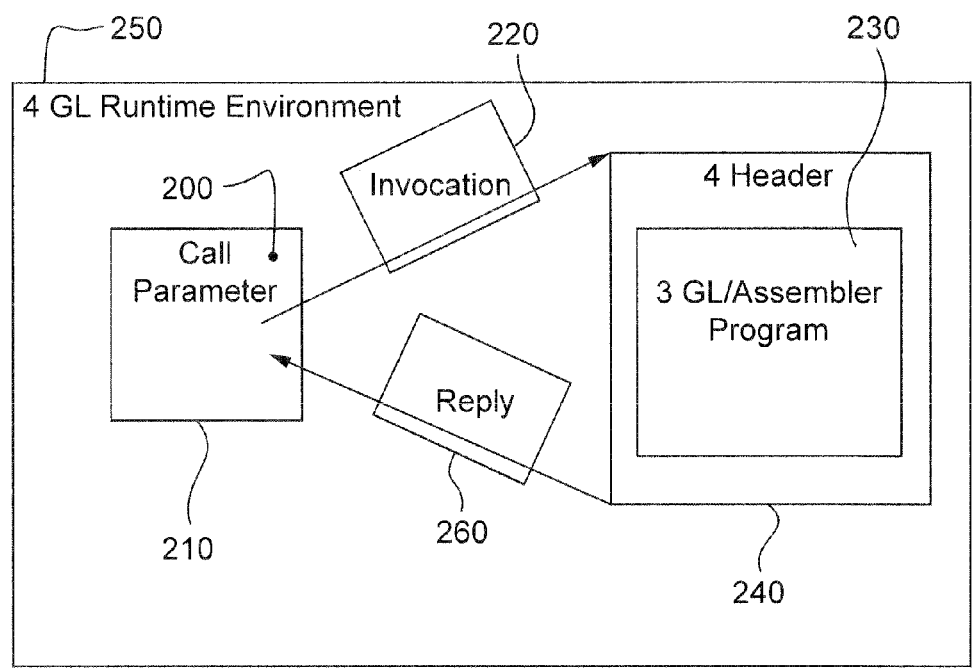
Figure 3:
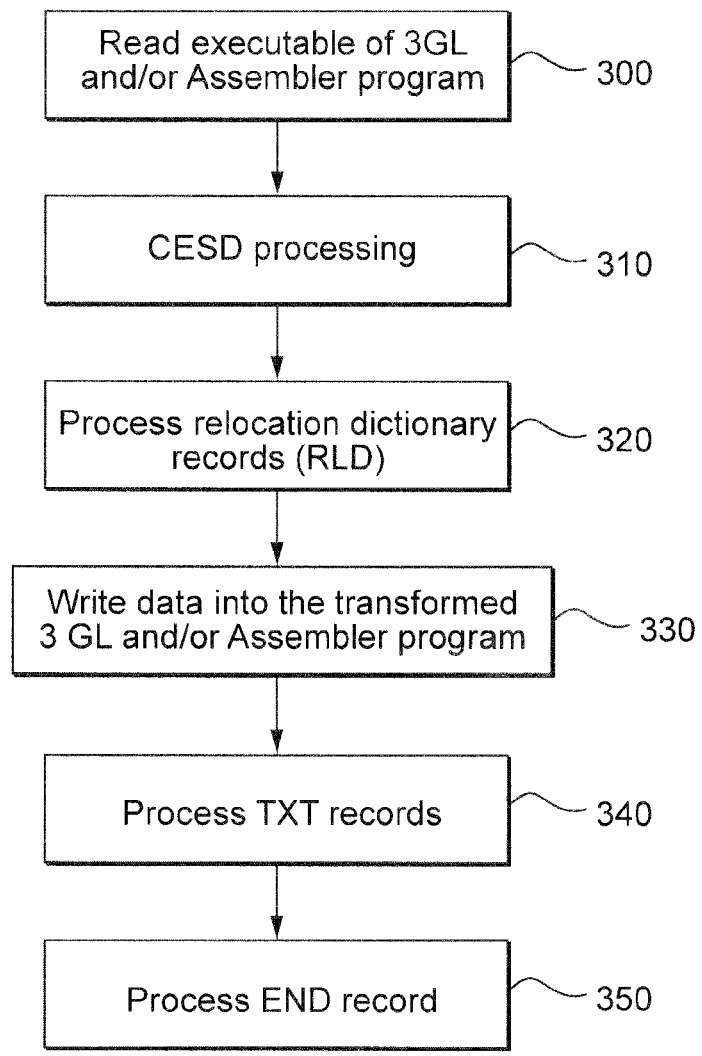
Figure 4:
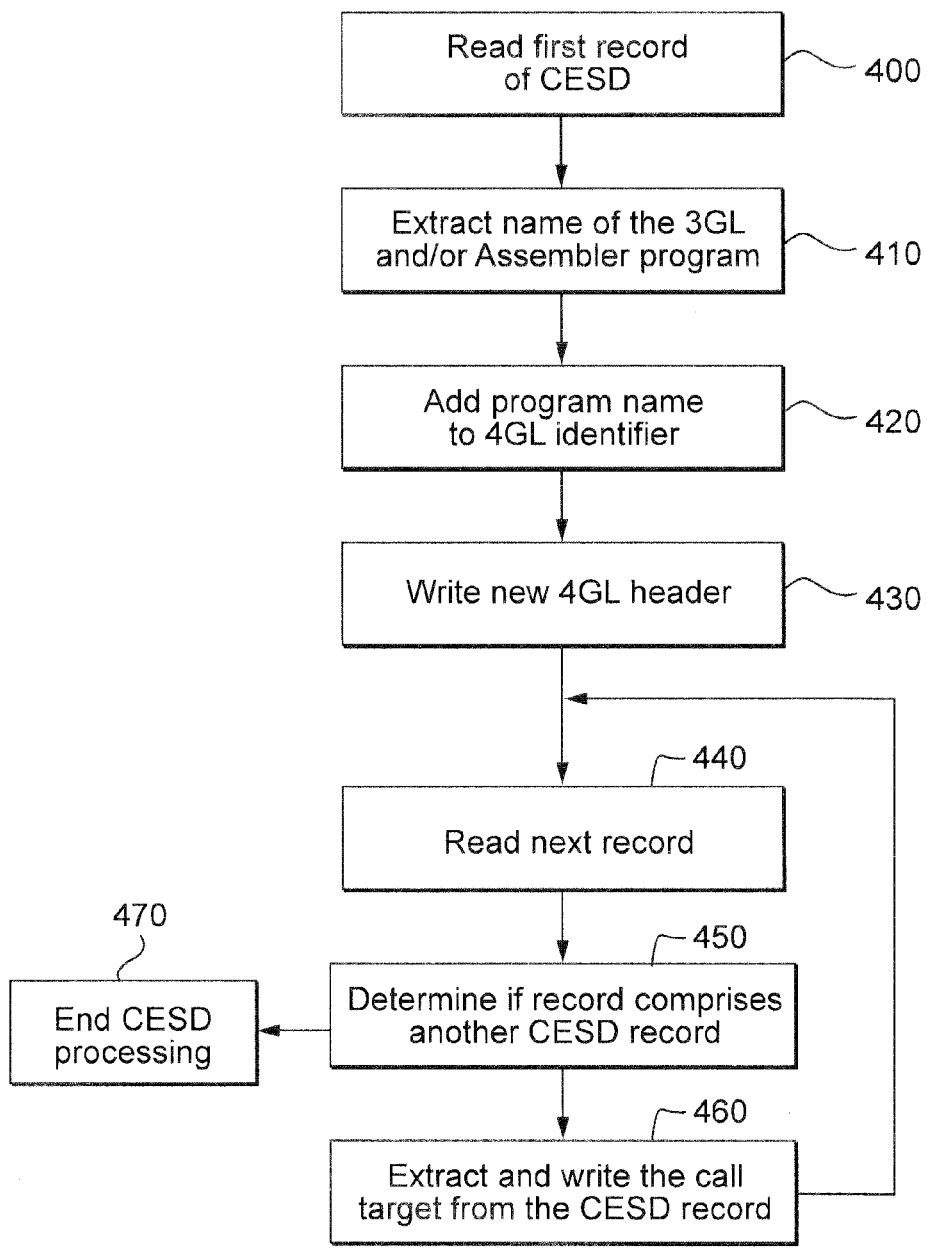
Figure 5:
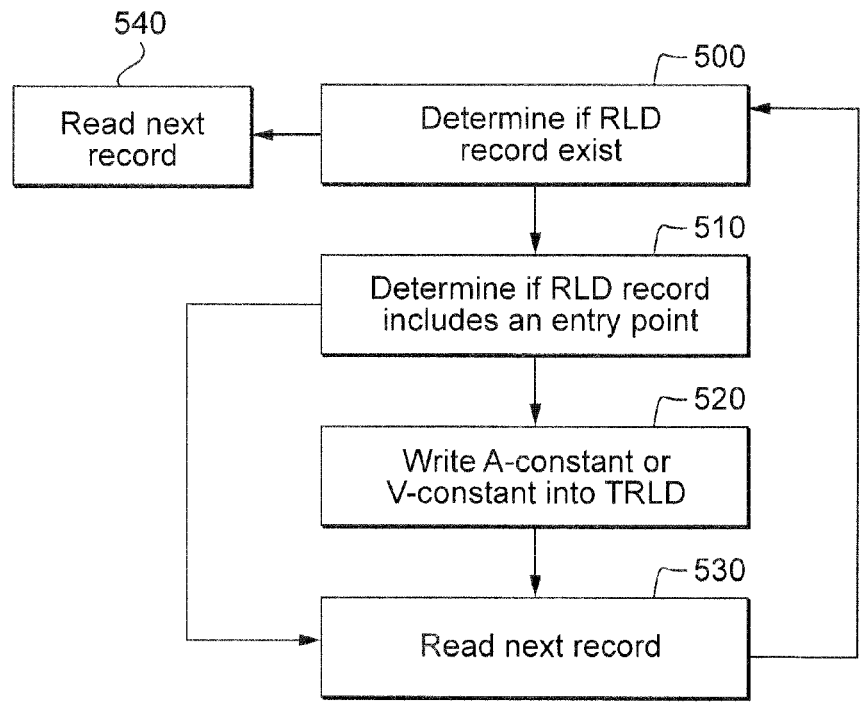
Figure 6:
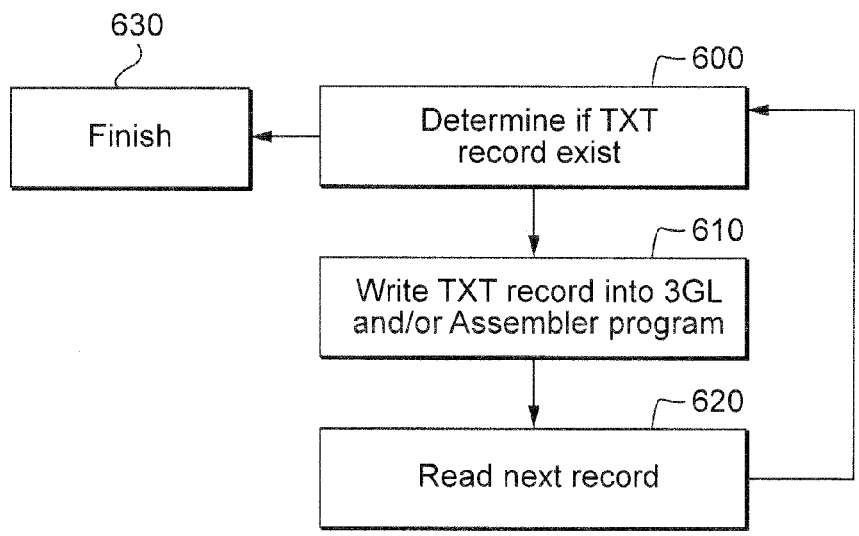
Figure 7:
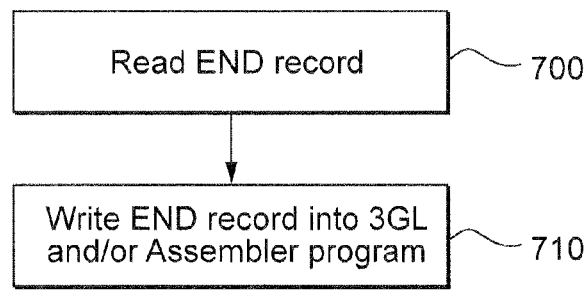
Figure 8:
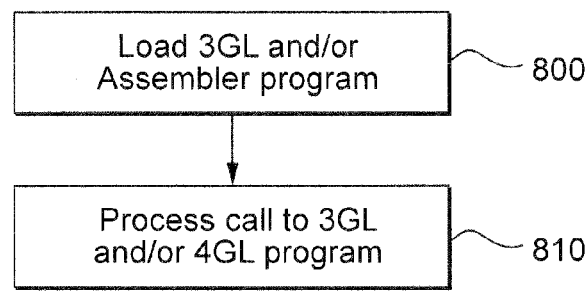
Figure 9:
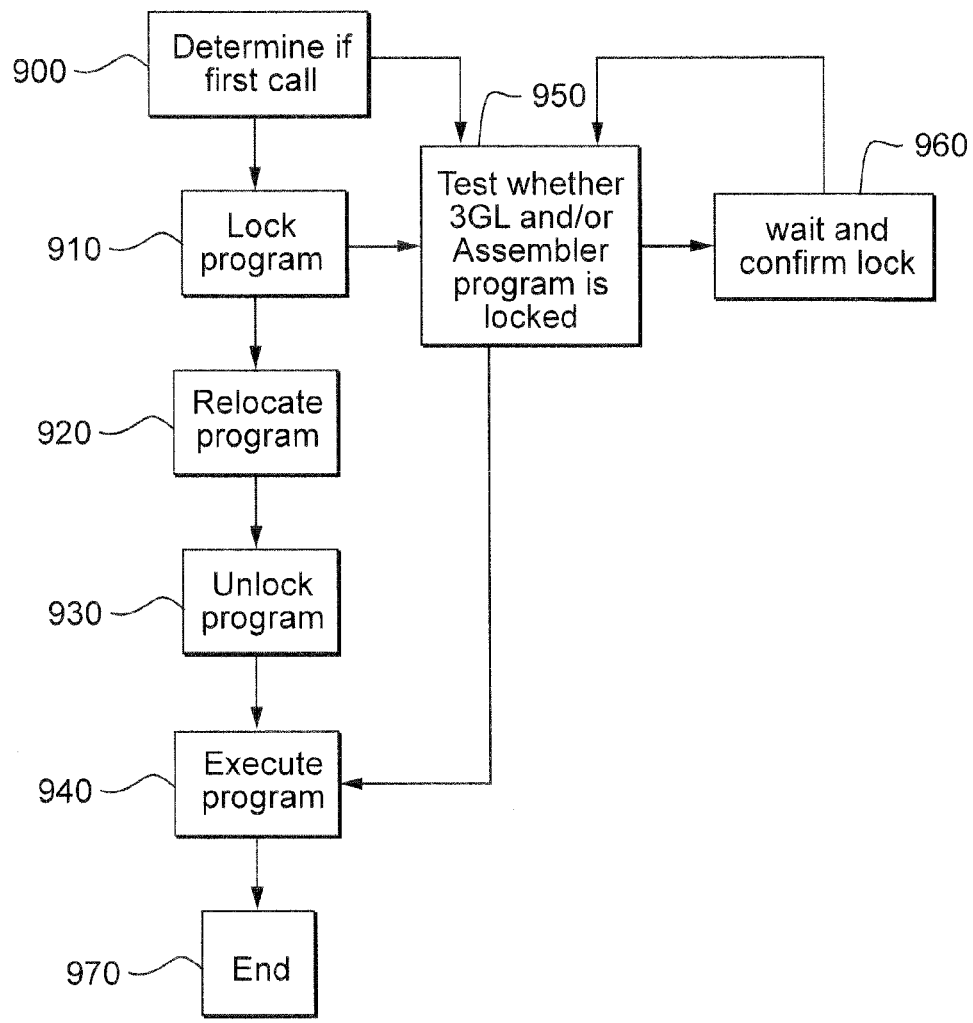
Figure 10:
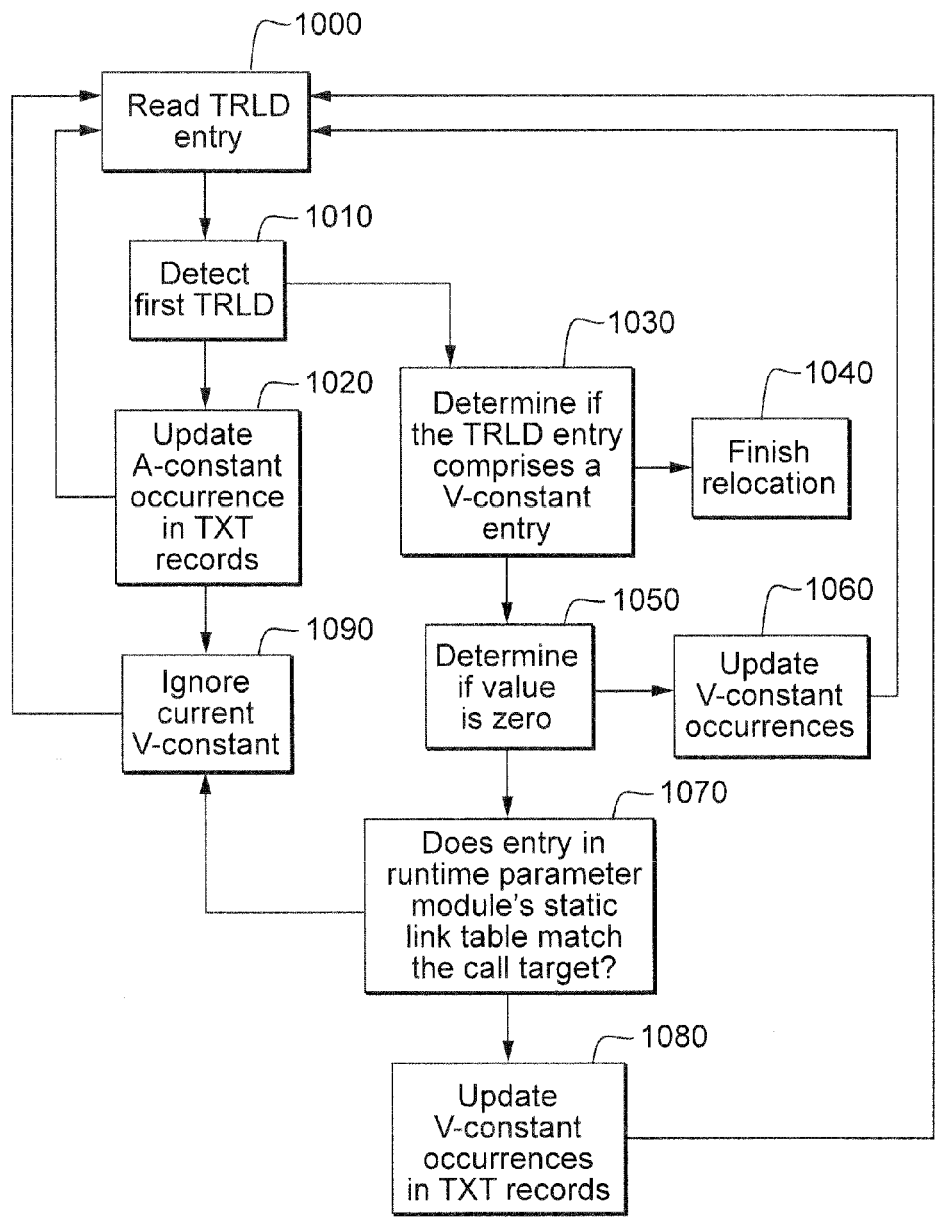
Figure 11:
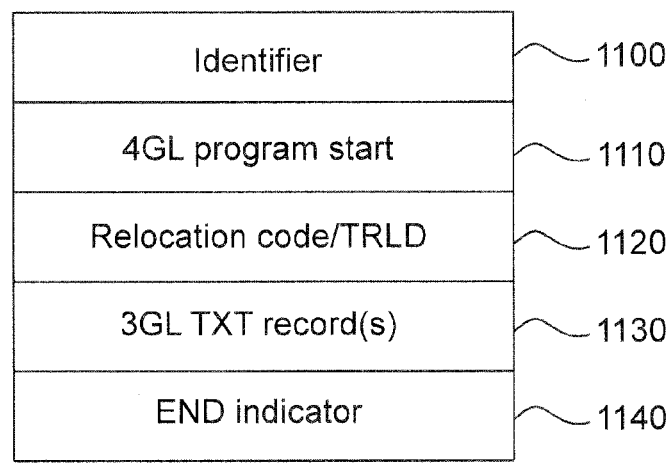
Figure 12:
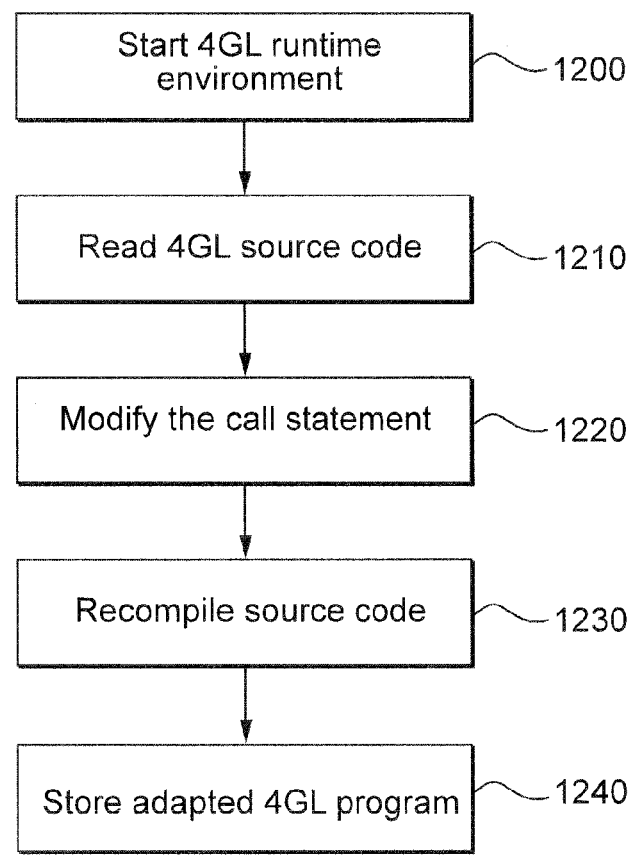
Figure 13:
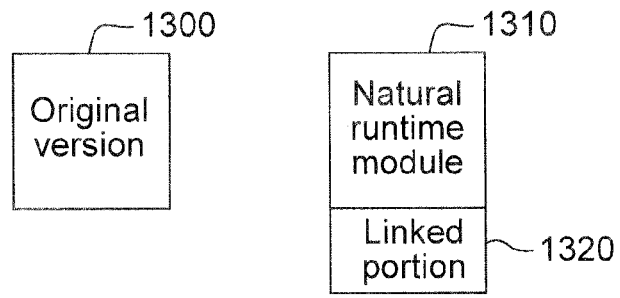
Figure 14:
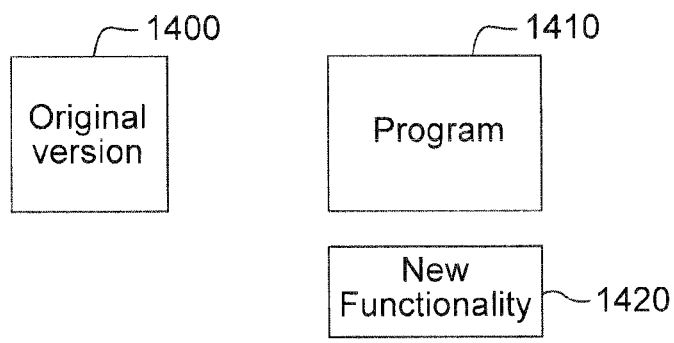

In the following detailed description, presently preferred embodiments of the invention are further described with reference to the following figures, wherein:

FIG. 1: illustrates the invocation of a 3GL program by a 4GL program (prior art);

FIG. 2: illustrates the invocation of a 3GL program by a 4GL program under a 4GL runtime environment in accordance with an embodiment of the present invention;

FIG. 3: illustrates the process of transforming a 3GL and/or Assembler program according to an exemplary embodiment to of the present invention;

FIG. 4: illustrates the processing of CESD records according to an exemplary embodiment of the present invention;

FIG. 5: illustrates the processing of RLD records according to an exemplary embodiment of the present invention;

FIG. 6: illustrates the processing of TXT records according to an exemplary embodiment of the present invention;

FIG. 7: illustrates the processing of End records according to an exemplary embodiment of the present invention;

FIG. 8: illustrates the loading and calling of the new 4GL program according to an exemplary embodiment of the present invention;

FIG. 9: illustrates the processing of a 4GL call according to an exemplary embodiment of the present invention;

FIG. 10: illustrates the relocation process according to an exemplary embodiment of the present invention;

FIG. 11: illustrates the structure of the new 4GL program according to an exemplary embodiment of the present invention;

FIG. 12: illustrates the modification of the 4GL program according to an exemplary embodiment of the present invention;

FIG. 13: illustrates how new functionality increases the module size (prior art); and FIG. 14: illustrates the procedure for adding new functionality in accordance with an embodiment of the present invention.

5. DETAILED DESCRIPTION OF THE FIGURES

As explained above, according to prior art the runtime environment has to be switched upon invocation of a program which was written in a different programming language, for example, IBM Cobol, IBM C, IBM PL/I, IBM Assembler, SAP ABAP or MicroFocus Cobol. The switching between runtime environments is also referred to as context switch. A context switch requires saving the current state in the runtime environment of the calling program, locating and loading the called program, initializing the appropriate called runtime environment, providing parameter values to the called runtime environment and activating the called runtime environment. At the end of the program call similar activities must be performed to re-activate the runtime environment of the calling program and pass control back.

The general principle of the present invention according to exemplary embodiments of the present invention will now be described with reference to the following figures. Therein, FIG. 2 provides a general overview about the invention, while FIGS. 3 to 12 describe embodiments of the invention in various aspects in further detail.

When the 4GL runtime environment executes a 4GL program and a transformed 3GL and/or Assembler program should be invoked, the 4GL runtime environment fetches the respective transformed 3GL and/or Assembler program by using the modified call statement in the modified 4GL program. The transformed executable of the 3GL program passes control to the relocation stub if available or to the 3GL code section embedded in the program. As a result, the 4GL program directly executes the called 3GL program.

In the embodiment of FIG. 2, a 4GL program 200 comprises the call parameter 210, which may specify that a transformed 3GL program 230 is to be called. During execution of the 4GL program 200, the call parameter invokes 220 the transformed 3GL program 230 by calling the 4GL header 240 of the transformed 3GL program 230. Thereby, the 4GL runtime environment invokes the transformed 3GL program as 4GL object (e.g., as 4GL CALLNAT object, if Natural is used as 4GL language). Then, the 3GL program 230 may be executed under the 4GL runtime environment 250 of the calling 4GL program 200. After the transformed 3GL program 230 has finished, the execution of the 4GL program 200 continues. In this way, context switches can be avoided and valuable computing resources are saved.

Another advantage of the present invention is the possibility to provide new functionality to the 4GL runtime environment directly and without providing new product versions: According to the prior art new functionality may only be provided during a change of version. However, the time span between two versions may by up to one year. The invention allows implement such functionality based on the transformed 3GL immediately, e.g., as an update meeting certain customer requests.

The above described general solution of the present invention will now be described in more detail in accordance with various embodiments of the present invention.

FIG. 3 illustrates the transformation of the 3GL and/or Assembler program in a general way and according to an exemplary embodiment. The original 3GL or Assembler program will not be modified during the transformation. The program may be provided with the header, routine, etc. to make it 4GL executable, but the 3GL program as it was remains the same. In step 300 the executable of the 3GL and/or Assembler program that is to be transformed is read. Step 310 relates to the CESD (composite external symbol dictionary) processing. The CESD contains to definitions or uses of external symbols in z/OS load modules to be processed. The CESD processing will be described further below with reference to FIG. 4. Thereafter, in step 320, the relocation dictionary records (RLD) are processed. This step will be described further below with reference to FIG. 5. In the next step 330, the table of relocation dictionary (TRLD) and the relocation code is written into the transformed 3GL and/or Assembler program that is being transformed so that it may be called by a 4GL program. As an example, the TRLD comprises all relevant information from the CESD/RLD records from the load module of the operating system environment (e.g., z/OS). These records are required to simulate the loader functionality (e.g., of z/OS) inside the 4GL runtime environment for the transformed 3GL program.

An example of a table of relocation dictionary in accordance with an embodiment of the present invention is shown below:

```
.*--------------------------------------------------------------------------------*
.*       MHK CREATED FOR NATCAN2 11-12-10 RLD-TABLE                  *
.*--------------------------------------------------------------------------------*
         AIF     (K'&L LE 3) .PFXOK
         MNOTE   8, 'CMRLD MAXIMUM PREFIX LENGTH EXCEEDED'
         MEXIT
.PFXOK   ANOP    ,
         AIF     ('&DSECT' NE 'YES') .NODS
&L       DSECT
         AGO     .NOLAB
.NODS    ANOP    ,
&L       DS      0F
.NOLAB   ANOP    ,
         SPACE
```

```
.*--------------------------------------------------------------------------------*
.*          RESULT OF RLD-ANALYSE                                         *
.*--------------------------------------------------------------------------------*
            SPACE                                          00001700
&L.COUNT  DS    F          NUMBER OF RLD-ENTRIES           02950000
          ORG   &L.COUNT
&L.FLAG   DS    XL1        RLD FLAG                        02950000
&L.DISP   DS    XL3        DISPLACEMENT                    02900000
&L.$      EQU   *-&L       NORMAL LENGTH
&L.INDEX  DS    XL2        INDEX FROM EXTERNAL TABLE
          DS    XL2        UNUSED
&L.$E     EQU   *-&L       LENGTH EXTENDED
          ORG   ,
          MEND                                             00010300
```

In step 340 the TXT records are processed. The processing of the TXT records (which comprise the executable code) will be described below with reference to FIG. 6. With reference to FIG. 7, the final step 350 of processing the END record will be described in more detail. The END record indicates the end of the program code in the executable. Thereafter, the transformation of the 3GL and/or Assembler program is finished. The above sequence of steps is intended as an example only and does not restrict the scope of protection. The above steps may also be performed in another sequence if necessary.

The CESD processing will now be described with reference to FIG. 4. As mentioned above the CESD records are processed in step 310. To this end, in step 400 the first record of the CESD is read. By reading the CESD, the name of the 3GL and/or Assembler program may be extracted in step 410. The program name is then added to the 4GL identifier, e.g., program header that is to be added to the transformed 3GL and/or Assembler program, step 420. The new 4GL header is then written into the transformed 3GL and/or Assembler program. Then, the next record is read in step 440. It is then determined in step 450 whether this record comprises another CESD record. If not, the processing of the CESD records ends in step 470. If another CESD record is found, the call target is extracted from the CESD record and written into the TRLD table, step 460.

Thereafter, the relocation dictionary (RLD) entries are processed. As mentioned above, this will now be described with reference to FIG. 5. In step 500, it is determined, whether a first RLD record exists. A RLD exists if there are entry points in the 3GL and/or Assembler program. Such entry points may be, e.g., A-constants or V-constants. If it is determined that a first RLD exists, it is further determined whether the first RLD record includes an entry point of the program, step 510. If there is no entry point in the first RLD record, the next record is read out, step 530, and the process restarts. However, if the first RLD record includes an entry point, the corresponding A-constant or V-constant is written into the TRLD, step 520. Then the next record is read out, step 530 and the process restarts in step 500. If the next record read out in step 530 does not comprise a RLD record the RLD processing finishes, step 540. However, if the record comprises a RLD record, the RLD record is processed as described above.

In FIG. 6, the processing of TXT records is described in further detail. Initially, it is determined whether a TXT record exists at all, step 600. If a TXT record exists, it is written into the 3GL and/or Assembler program that is being transformed, step 610. Then, the next record is read out, step 620. If the next record comprises a TXT record, the process starts again. Otherwise, i.e., if there is no TXT record, the process finishes, step 630.

With reference to FIG. 7, the END record is processed. In step 700, the END record is read. Then the END record is written into the transformed 3GL and/or Assembler program, step 710.

An example of the structure of a transformed 3GL program according to an exemplary embodiment of the present invention could look as follows:

```
*--------------------------------------------------------------------------------,
! Natural Program header                                                         !
!                                                                                !
! Relevant fields are: EXDOBJTYPEC, EXDOBJNAME, EXDPGMNOCTYPE, !
! EXDTABTYPE = EXDTABNOC                                                         !
*--------------------------------------------------------------------------------,
! Pseudo OP code for NOC-start of optimized code                                 !
*-----------------------------Z--------------------------------------------------,
! relocation stub code to relocate A and V constants in the TXT                  !
! records of the transformed 3GL program (if necessary)                          !
*--------------------------------------------------------------------------------,
! transformed 3 GL program code as TXT records                                   !
*--------------------------------------------------------------------------------,
! Pseudo OP code for NOC-end of optimized code                                   !
*--------------------------------------------------------------------------------,
```

FIG. 8 illustrates the loading and calling of the transformed 3GL and/or Assembler program. In step 800, the transformed 3GL and/or Assembler program is loaded into the 4GL program cache memory. Then, the transformed 3GL and/or Assembler program may be called by an existing 4GL program using a suitable call command. The call to the transformed 3GL and/or 4GL program may then be processed, step 810.

The processing described above with reference to FIG. 8, will now be described in further detail with reference to FIG. 9. Initially it is checked whether the transformed 3GL and/or Assembler program is called for the first time, step 900. If the transformed 3GL and/or Assembler program is called for the first time it has to be relocated. If the program is not called for the first time, it is tested whether the transformed 3GL and/or Assembler program is presently locked, step 950. This could happen if it is concurrently called by another 4GL program for the first time. If the transformed 3GL and/or Assembler program is locked, the process waits, step 960, and confirms, if necessary multiple times, whether the program is still locked. When it is no longer locked or was to not locked at all (as a result of the determination of step 950), the transformed 3GL and/or 4GL program is executed, step 940, without requiring a change of the runtime environment. The method ends in step 970. However, if it is determined in step 900 that the transformed 3GL and/or Assembler program is called for the first time, the method proceeds to step 910 and locks the program. The locked program is then relocated, step 920, as described in further detail with reference to FIG. 10. After the relocation of the transformed 3GL and/or Assembler program is finished, the program is unlocked, step 930. Finally, the transformed 3GL and/or Assembler program may be executed, step 940.

As mentioned above, the relocation process will now be described in further detail with reference to FIG. 10. In order to perform the relocation, the first TRLD entry is read, step 1000. If an A-constant is detected in the first TRLD, step 1010, the relocation process proceeds to step 1020 and updates all A-constant occurrences in TXT records with buffer pool (BP) start address and the value of the A-constant. In one embodiment BP relates to the Natural Buffer Pool, which may be of type "global" (per logical partition, LPAR) or "local" (per address space). If Natural is used as 4GL, the Buffer Pool corresponds to the 4GL program cache memory. Then, the process restarts in step 1000 and processes the next TRLD entry (if there is a further TRLD entry). If no A-constant entry was detected in step 1010, it is determined whether the TRLD entry comprises a V-constant entry, step 1030. If there is also no V-constant, the relocation process finishes, step 1040. Upon detection of a V-constant, it is determined whether its value is zero or not, step 1050. If the value of the V-constant is not zero, all V-constant occurrences in the TXT records are updated with the BP start address and the value of the corresponding V-constant (step 1060), and the process restarts in step 1000. Upon determination that the value of the V-constant is zero (in step 1050) it is checked (in step 1070) whether the entry in the runtime parameter module's static link table matches the call target. For example, in Natural of applicant, the NATPARM (Natural Parameter Module) CSTATIC table is checked for a match. The CSTATIC parameter can be used to define a list of names of non-Natural programs which are to be linked together with the Natural parameter module (NATPARM). If there is a match, all V-constant occurrences in the TXT records are updated with the CSTATIC value, step 1080. The method then proceeds to step 1000 and reads the next TRLD entry (if there is one). If no match between the NATPARM CSTATIC entry and the call target is determined in previous step 1070, the current V-constant may be ignored, step 1090. The method proceeds to step 1000, where the next TRLD entry is read (if there is any). If there are any V-constants found in the TLRD which have a value of zero during runtime, it may be tried to resolve them. These V-constants may only be satisfied from within the Natural runtime: either they are calls into the Natural runtime itself or the respective module(s) must have been linked to Natural. To this end, the CSTATIC table of the NATPARM module may be used. Preferably, nothing is loaded dynamically during runtime. However, this could also be done, e.g., using a z/OS loader if the PARM option has been correctly set.

FIG. 11 generally illustrates the structure of the transformed 3GL and/or Assembler program in accordance with an exemplary embodiment of the present invention. In more detail, the transformed 3GL and/or Assembler program comprises an identifier 1100, e.g., a header, comprising the program name and identifying the program as 4GL executable code.

An example of a header (based on Natural as 4GL) according to an exemplary embodiment of the present invention is shown below. Please note that the executable code is identified in Natural of applicant as "Natural Optimized Code":

```
.*********************************************************************
.*@$@                    STANDARD MAINTENANCE LOG                @$@*
.*********************************************************************
.*Description             |Date      |Problem        |Zap      |Log ID *
.*                        |YYMMDD    |               |NXxnnnn  |       *
.*----------------------- |--------  |-------------  |-------- |-------*
.*PROFILER &P.PGMF2PROF   |110411    |NATMF-17699    |-------- |-------*
.*----------------------- |--------  |-------------  |-------- |-------*
                                ...
.*USER DEFINED FUNCTIONS  |080509    |NRT 1017       |-------- |-------*
.*********************************************************************
.*      MNOTE *,'NAMEXDIR ************    START    *************'
.*      MNOTE *,'NAMEXDIR V31 DIRECTORY, CATALOGED OBJECT'
        ...
        ...
        ...
*********************************************************************
*              NATURAL EXECUTABLE DIRECTORY
*
*         PARAMS:
*                TYPE = DSECT      DSECT OR STORAGE
                       ...
```

-continued

```
*----------------------------------------------------------------
*       OBJECT INDEPENDENT INFO
*----------------------------------------------------------------
&P.EYECATCHER    DS   CL8         EYE CATCHER
                             ...
&P.OBJTYPEC      DS   CL8         OBJECT TYPE (CHARACTER)
&P.PGMTYPEC      DS   CL12        PROGRAM TYPE CHARACTER
&P.OBJNAME       DS   CL32        OBJECT NAME
                             ...
*----------------------------------------------------------------
*       EXECUTABLE OJECTS
*----------------------------------------------------------------
          SPACE
                             ...
             SPACE
*----------------------------------------------------------------
*       THREAD INFO
*----------------------------------------------------------------
                             ...
             SPACE
*----------------------------------------------------------------
*       TABLE INFO
*----------------------------------------------------------------
                             ...
             SPACE
*----------------------------------------------------------------
*       INFO PART
*----------------------------------------------------------------
                         ...
             SPACE
&P.PGMNOCTYPE    DS   CL8         TYPE OF NOCCODE
             SPACE
                             ...
*----------------------------------------------------------------
*       V82 EXTENSION
*----------------------------------------------------------------
                             ...
*----------------------------------------------------------------
*       TABLES IN BUFFERPOOL
*----------------------------------------------------------------
                             ...
&P.TABPNOC       EQU  01          NOC CODE
                             ...
*----------SPACE-------------------------------------------------
*       TABLES IN THREAD
*----------------------------------------------------------------
                             ...
             SPACE
*----------------------------------------------------------------
*       TABLES ONLY AT RUNTIME
*----------------------------------------------------------------
                             ...
             SPACE
*----------------------------------------------------------------
*       MISCELLANEOUS TABLES
*----------------------------------------------------------------
                             ...
*----------------------------------------------------------------
*       END
*----------------------------------------------------------------
```

The "NOC" parameters in the header identify the 3GL program as "Natural Optimized Code". In Natural, this Natural Optimized Code is usually an already machine-coded program, which does not require being compiled or interpreted: it only needs to be executed. Disguising the 3GL program as "Natural Optimized Code" tricks the runtime environment of the 4GL program into executing the 3GL program without calling the external 3GL environment. This, of course, requires proper linking of the constants required by the 3GL program in order to function as the 3GL program should. Therefore, it is important to have a relocation routine as described above for making the constants accessible for the 3GL program.

A flag may be used to mark the program as being executable in a 4GL runtime environment. Furthermore, the transformed 3GL and/or Assembler program indicates the 4GL program start, 1110. The transformed 3GL and/or Assembler program further comprises a lock indicator, i.e., indicating whether the program is locked or not. As explained above, this is relevant if the relocation is ongoing. Further, the executable of the transformed 3GL and/or Assembler program comprises the relocation code and the table of relocation dictionary (TRLD), 1120. Following the code, the transformed 3GL and/or Assembler program comprises the 3GL TXT records, 1130, and the END indicator of the program, 1040. Thus, FIG. 11 is an overview about a possible structure of a transformed 3GL and/or Assembler program.

The transformed 3GL executable is stored in the program store of the 4GL programs, e.g., for Natural it is stored in the Natural System File (Data Base). The Natural System File refers to a persistent storage. On the Natural System File all Natural source and compiled programs are stored. On mainframes the Natural System File is stored in a database, e.g., Adabas or VSAM.

Another aspect of the present invention is directed to the adaptation of the 4GL program. In step 1200 of FIG. 12, the existing 4GL runtime environment is started. This runtime environment is necessary for executing the 4GL program. Thereafter, the 4GL source code is read, step 1210. In the source code of the 4GL program the call statement is modified so that it does not relate to an external program written in another programming language but to the transformed 3GL and/or Assembler program, step 1220. As mentioned above, calling such an external program written in another language would require a change of the runtime environment. Thus, the changed call statement relates to the invocation of a subprogram which is programmed in the same programming language. For instance, when using Natural as programming language, the statement CALL is changed to the CALLNAT statement. After changing the source code of the 4GL program, it has to be recompiled, step 1230. Finally, the adapted 4GL program is stored and may be executed, step 1240. In an embodiment of the present invention, the transformed 3GL program uses the runtime functionality of the existing 4GL runtime environment. In other words, there is no modification of the 4GL runtime environment. However, it is also conceivable that some modifications may be necessary to the 4GL runtime environment.

However, the above order of transformations and modifications is considered to be arbitrary, another order is also conceivable. For instance, the modification of the 4GL program and the transformation of the 3GL and/or Assembler program may also be switched.

As an example, the above described embodiments may be applied to a program written in the 4GL language Natural, which is a programming language available from applicant, in the following way. In this to embodiment, the existing Natural runtime environment is used without any modifications.

The transformation can be carried out by a separate tool or program. The adaptation may be made automatically by the tool, but also semi-automatically or even manually, e.g., by using an editor. The same tool or a separate tool inspects the 3GL and/or Assembler executable for relocation stub issues. As an example, there may be multiple callable entry points in the executable.

Further, the tool adapts the 3GL program during loading into the Natural object cache as will be explained in the following. The tool has to run only once, i.e., when the 3GL program is analyzed. The tool transforms the 3GL program so that it behaves as 4GL program, which may be called as subprogram of a Natural program. In other words, it is called by the CALLNAT command instead of the CALL command used for non-Natural programs.

The transformed program comprises a Natural program identifier, e.g., a program header which declares the program as Natural optimized code (NOC). The transformed 3GL program further comprises a pseudo operation code for the Natural optimized code in the generated program (GP). The pseudo operation code may be used to control the Natural optimized compiler during runtime so that the compiler may execute the transformed 3GL and/or Assembler program. Further, a corresponding pseudo operation code for stopping the Natural optimized code is needed. The operation code for the NOC points to the relocation stub code (if necessary) or directly to the 3GL program code. The steps of transforming the 3GL program may be performed in accordance with any of the embodiments described herein. For the relocation, the default Natural parameter module NATPARM contains a set of predefined parameters that are sufficient for most computing environments. CSTATIC can be used to define a list of names of non-Natural programs which are to be linked together with the Natural parameter module NATPARM. The transformed Assembler and 3GL programs will be marked as Natural optimized code and stored with the Natural programs in the Natural system file.

The transformed 3GL and/or Assembler program now works in the same way as if a Natural program was compiled with Natural Optimizer Compiler.

The 4GL runtime environment can use the Natural program cache (buffer pool) to preload and cache the transformed programs to further improve application runtime performance. To this end, the transformed 3GL and/or Assembler program can be included in the buffer pool preload list. In this way, the program will be loaded by the global buffer pool manager into the buffer pool before it is loaded by a 4GL program for the first time. The preload list is used to select which program is to be preloaded. The preload list is managed by the buffer pool manager. However, the list may be defined by other entities and/or by using a pre-allocation list. When the Natural runtime environment executes a former CALL statement, now CALLNAT statement, the called program, i.e., a transformed 3GL and/or Assembler program, will be located in the Natural program cache memory (buffer pool) when preloaded or loaded into the Natural program cache and executed in the same way as any other Natural program. Context switches and operating system interrupts are avoided and performance improved.

According to an embodiment of the present invention, new functionality for the 4GL runtime can be delivered by providing transformed 3GL and/or Assembler programs instead of extending the 4GL programming language runtime environment. In other words, the 4GL runtime environment can be left unchanged since new functionality is integrated by transformed 3GL programs. This is shown in FIG. 13, which relates to the prior art solution, and by FIG. 14, which corresponds to the solution of the present invention. In FIG. 13, the size of the Natural runtime module 1310 is increased by the newly linked portion 1320 as compared to the original version 1300 of the program. This new functionality of the newly linked portion 1320 can only be called from a 4GL program by using the CALL API. However, in FIG. 14, the size of the program 1410 does not change as compared to the original version 1400 since the new functionality 1420 is provided as CALLNAT, i.e., as Natural subprogram, which means that the new functionality is invoked by the CALLNAT API of the 4GL program. Moreover, the term size refers to the available functionality of the core of the runtime. There is no longer the need to modify the already stable and proven core to add new functionality. The core of the runtime remains the same, but further functionality can now be added as modules. In other words, the transformed 3GL and/or Assembler program may be added as module so that it can be executed within the 4GL runtime environment. This allows for simple and continuous delivery of new functionality without changing the core runtime environment of the 4GL system. Therefore the 4GL runtime environment quality is not compromised.

In one embodiment, the Natural runtime environment is capable to execute on IBMs special purpose processors (zIIP). These zIIP processors operate in a Service Request Block (SRB) mode, where no interrupts, like I/O or operating system calls are allowed. Before an interrupt occurs, Natural switches to Task Control Block (TCB) mode and continues to operate on a general purpose processor (GCP). Natural switches back to SRB mode, when the interrupt processing finishes. The switch from SRB to TCB mode is costly and the number of switches impact runtime performance. In this embodiment, no SRB/TCB switches are necessary since no runtime switch is necessary for the 4GL and 3GL (CALL API). This is because the transformed 3GL and/or Assembler program is regarded as 4GL program (CALLNAT API).

When a Natural program calls a dynamically loaded 3GL and/or Assembler program, up to 3 switches per call could be performed: 1. loading, 2. calling, and 3. deleting the called program. For statically loaded 3GL or Assembler programs one switch is necessary. This generally applies to all 3GL programs that are dynamically loaded. In the zIIP mode, this results in a maximum of three additional switches from SRB to TCB mode, which is very extensive in terms of CPU time.

3GL and/or Assembler programs that are able to run in SRB mode, i.e. do not perform I/O, can be transformed and executed in the Natural runtime and switching from SRB to TCB mode can be avoided and runtime performance will be enhanced. If the 3GL programs are available as CALLNAT programs, i.e., as transformed 3GL programs, the Natural runtime environment considers these programs as being internal programs. Thus, all SRB/TCB switches become obsolete and the transformed 3GL program (invoked by the CALLNAT command) runs in SRB mode only.

It is noted that in transforming a 3GL and/or an Assembler program so that it/they can be executed within a 4GL runtime environment, a 4GL identifier can be included in the executable of the 3GL and/or the Assembler program when the program is stored on a non-transitory computer readable storage medium, e.g., by having a processor open, edit, and modify the underlying file that is saved to a computer system.

All embodiments described herein with reference to a method may also be implemented by using suitable modules or means. The embodiments may also be implemented in a computer program. In one embodiment the computer program could be stored on any suitable medium (e.g., a non-transitory computer readable storage medium).

It will be appreciated that as used herein, the terms system, subsystem, service, module, program logic, programmed logic circuitry, and the like may be implemented as any suitable combination of software, hardware, firmware, and/or the like. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Similar statements apply with respect to the clients, servers, and/or other elements in various network arrangements.

In one embodiment, the following macro code may be used to generate the program header (in this example a Natural Standard Program Header) as set forth in the program listing that follows:

Program Listing

```
         MACRO
         NAMEXDIR &TYPE = DSECT, &P = EXD, &HDR = YES, &EXE = NO,
               &SYM = NO, &DDM = NO, -&TAB = NO
.***********************************************************************
.*@$@              STANDARD MAINTENANCE LOG                    @$@*
.***********************************************************************
.*Description                  |Date    |Problem       |Zap      |Log ID *
.*                             |YYMMDD  |              |NXxnnnn  |       *
.*---------------------------  |------  |------------- |-------  |------ *
.*PROFILER &P.PGMF2PROF        |110411  |NATMF-17699   |-------  |------ *
.*---------------------------  |------  |------------- |-------  |------ *
.*NEW MAINTENANCE POLICY       |101111  |NATMF-876     |-------  |------ *
.*---------------------------  |------  |------------- |-------  |------ *
.*BREAK 64K LIMIT (BRT/STF)    |100416  |NATMF-24      |-------  |------ *
.*-&P.PGMF1BS4 . . . BREAK/STANDARD FUNCTIONS 4 BYTE OFFSET            *
.*---------------------------  |------  |------------- |-------  |------ *
.*INCREASE NUMERIC PRECISION   |100416  |NATMF-12      |-------  |------ *
.*      -&P.PGMSECTV82                                                 *
.*      -&P.PGMSECTLENPGM82                                            *
.*      -COMPILE OPTIONS PARTS 2 (FINAL, INITIAL, MODIFIED)            *
.*      -116 BYTES RESERVE (128 - 12) = (128 - L'COMPILE OPTIONS PART2) *
.*---------------------------  |------  |------------- |-------  |------ *

.*BUILT-IN SYSTEM FUNCTIONS    |081020  |NRT 1340      |-------  |------ *
.*---------------------------  |------  |------------- |-------  |------ *
.*BUILT-IN SYSTEM FUNCTIONS    |081020  |NRT 1340      |-------  |------ *
.*---------------------------  |------  |------------- |-------  |------ *
.*USER DEFINED FUNCTIONS       |080509  |NRT 1017      |-------  |------ *
.***********************************************************************
.*     MNOTE *,'NAMEXDIR   ***********   START   *************'
.*     MNOTE *,'NAMEXDIR   V31 DIRECTORY, CATALOGED OBJECT'
.*     MNOTE *,'NAMEXDIR   LAST CHANGE: 2002-06-03 JS'
.*     MNOTE *,'NAMEXDIR   USINGS: &P.SECT'
.*     MNOTE *,'NAMEXDIR   . . .     &P.PGMSECT'
.*     MNOTE *,'NAMEXDIR   . . .     &P.SYMSECT'
.*     MNOTE *,'NAMEXDIR   . . .     &P.DDMSECT'
.*     MNOTE *,'NAMEXDIR   . . .     &P.TABSECT'
.***********************************************************************
*        NATURAL EXECUTABLE DIRECTORY
*
*        PARAMS:
*           TYPE = DSECT          DSECT OR STORAGE
*           P    = EXD            PREFIX
*           HDR  = YES            GEN INDEPENDENT   PART
```

Program Listing

```
*         EXE  = NO           GEN EXECUTABLE   PART
*         SYM  = NO           GEN SYMBOLTABLE  PART
*         DDM  = NO           GEN DDM          PART
*         TAB  = NO           GEN TABLE DESCRIPTION
*
**********************************************************************
          AIF           ('&HDR' NE 'YES') .JS03
          AIF           ('&TYPE' EQ 'DSECT') .JS01
&P.SECT   DS    0A
          AGO   .JS02
.JS01     ANOP
&P.SECT DSECT
.JS02     ANOP
*----------------------------------------------------------------------
*         OBJECT INDEPENDENT INFO
*----------------------------------------------------------------------
&P.EYECATCHER   DS    CL8           EYE CATCHER
          SPACE
&P.NATVERS      DS    CL4           NATURAL VERSION
&P.NATSM        DS    CL4           NATURAL SM LEVEL
          ORG   *-8
&P.MAJOR  DS          CL2           (P/M) MAJOR VERSION

&P.DOT1   DS          CL1           (P/M) PERIOD
&P.MINOR  DS          CL2           (P/M) MINOR VERSION
&P.DOT2   DS          CL1           (P/M) PERIOD
&P.SPACK  DS          CL2           (P/M) SERVICE PACK
          SPACE
&P.DIRVERS      DS    F             DIRECTORY VERSION
&P.OBJTYPEC     DS    CL8           OBJECT TYPE (CHARACTER)
&P.PGMTYPEC     DS    CL12          PROGRAM TYPE CHARACTER
&P.OBJNAME      DS    CL32          OBJECT NAME
&P.OBJLIB       DS    CL32          LIBRARY
          SPACE
&P.TIMESTAMPO   DS    CL8           TIMESTAMP ORIGINAL
&P.TIMESTAMPC   DS    CL8           TIMESTAMP CURRENT
&P.DATE         DS    CL8           DATE (YYYYMMDD)
&P.TIME         DS    CL7           TIME (HHMMSST)
          SPACE
&P.MODE         DS    CL1           MODE
&P.MODEREP      EQU   C'R'          REPORT MODE
&P.MODESTRUCT   EQU   C'S'          STRUCTURED MODE
&P.MODEUNDEF    EQU   X'00'         UNDEFINED MODE (LDA, DDM)
          SPACE
&P.OBJTYPE      DS    F             OBJECT TYPE
```

-continued

| | | | Program Listing |
|---|---|---|---|
| &P.OBJTPGM | EQU | 0 * 4 | .PROGRAM |
| &P.OBJTSYT | EQU | 1 * 4 | .SYMBOL TABLE |
| &P.OBJTDDM | EQU | 2 * 4 | .DDM |
| SPACE | | | |
| &P.PGMTYPE | DS | F | PROGRAM TYPE (MAP, SUBROUTINE) |
| SPACE | | | |
| &P.LENGTH | DS | F | LENGTH DIRECTORY |
| &P.DATALEN | DS | F | (CONTIGUES) LENGTH OF DATA |
| &P.DEPOFF | DS | F | OFFSET DEPENDANT INFO |
| SPACE | | | |
| &P.CODEPAGE | DS | F | CODE PAGE |
| &P.USERID | DS | CL8 | USER ID |
| &P.TERMID | DS | CL8 | TERMINAL ID |
| &P.TUSER | DS | CL8 | TERMINAL USER ID |
| &P.OPSYS | DS | CL8 | OPERATING SYSTEM |
| &P.TPSYS | DS | CL8 | TP SYSTEM |
| &P.TRANS | DS | CL8 | TRANSACTION |
| SPACE | | | |
| &P.NDB | DS | F | NUMBER DATA BLOCKS |
| SPACE | | | |
| | DS | 15F | *** RESERVE |
| | DS | 0F | |
| &P.SECTLEN | EQU | *-&P.SECT | LENGTH |
| EJECT | | | |
| .JS03 | ANOP | | |
| | AIF | ('&EXE' NE 'YES') .JS06 | |
| | AIF | ('&TYPE' EQ 'DSECT') .JS04 | |
| &P.PGMSECT | DS | 0A | |
| | AGO | .JS05 | |
| .JS04 | ANOP | | |
| &P.PGMSECT | DSECT | | |
| .JS05 | ANOP | | |
| *------------------------------------------------------------------------------- | | | |
| * | EXECUTABLE OBJECTS | | |
| *------------------------------------------------------------------------------- | | | |
| SPACE | | | |
| &P.PGMEYEC | DS | CL16 | EYE CATCHER |
| &P.PGMSECTL | DS | F | LENGTH |
| &P.PGMSECTV | DS | F | VERSION |
| &P.PGMSECTV00 | EQU | 00 | . BASE VERSION |
| &P.PGMSECTV82 | EQU | X'8200' | . V82-BASE |
| SPACE | | | |
| | DS | 4F | *** RESERVE |
| SPACE | | | |
| &P.PGMFUNCN | DS | F | # EXT. FUNCTIONS |

Program Listing

```
            SPACE
&P.PGMGABN        DS    F         # GDA DYN VARIS
&P.PGMGABOFF      DS    F         OFFSET GDA DYN VARIS
            SPACE
&P.PGMHMUOFF      DS    F         OFFSET HIDDEN MU TABLE
&P.PGMHMULEN      DS    F         LENGTH HIDDEN MU TABLE
            SPACE
&P.PGMINSD        DS    F         # INSTANCE VARI (DEFINED)
            SPACE
&P.PGMTABMTOFF    DS    F         OFFSET MISC TABLES
&P.PGMTABMTNUM    DS    F         NUMBER MISC TABLES
            SPACE
*----------------------------------------------------------
*       THREAD INFO
*----------------------------------------------------------
&P.PGMTOFF        DS    F         OFFSET THREAD PROTOTYPE
&P.PGMTLEN        DS    F         LEN THREAD PROTOTYPE
&P.PGMTPAD        DS    F         LEN THREAD PADDED
            SPACE
*----------------------------------------------------------
*       TABLE INFO
*----------------------------------------------------------
&P.PGMTABBPOFF    DS    F         OFFSET BP TABLES
&P.PGMTABBPNUM    DS    F         NUMBER BP TABLES
&P.PGMTABTHOFF    DS    F         OFFSET THREAD TABLES
&P.PGMTABTHNUM    DS    F         NUMBER THREAD TABLES
&P.PGMTABVTOFF    DS    F         OFFSET VIRTUAL TABLES
&P.PGMTABVTNUM    DS    F         NUMBER VIRTUAL TABLES
            SPACE
*----------------------------------------------------------
*       INFO PART
*----------------------------------------------------------
&P.PGMONERR       DS    F         OFFSET ON-ERROR-CLAUSE
&P.PGMREPN        DS    F         # REPORTS
&P.PGMWORKN       DS    F         # WORK FILES
&P.PGMESUBN       DS    F         # EXT. SUBROUTINES
&P.PGMSUBNAME     DS    CL32      NAME SUBROUTINE/CLASS
&P.PGMGDANAME     DS    CL32      NAME GDA
&P.PGMDASTCK      DS    CL8       TOD GDA CATALOGED
&P.PGMGDABN       DS    F         # GDA BLOCKS
&P.PGMGDASIZE     DS    F         SIZE USED GDA
&P.PGMAIVN        DS    F         # AIV'S (EVDT SLOTS)
&P.PGMAIVOFF      DS    F         OFFSET 1ST AIV SLOT
&P.PGMPARMN       DS    F         # PARAMETERS (EVDT SLOTS)
```

| | | | |
|---|---|---|---|
| Program Listing | | | |
| &P.PGMPARMOFF | DS | F | OFFSET 1ST PARM SLOT |
| &P.PGMCTXTN | DS | F | # CONTEXTVAR (EVDT SLOTS) |
| &P.PGMCTXTOFF | DS | F | OFFSET 1ST CONTEXT SLOT |
| | SPACE | | |
| &P.PGMVERS | DS | CL1 | VERSION, UP FROM V31 |
| * | | EQUATES CAN BE FOUND IN NAMIDIR/IDR22VER | |
| | SPACE | | |
| &P.PGMSIGN | DS | CL1 | SIGN OF PACKED FIELDS |
| &P.PGMPSRT | EQU | 0 | .USE RUNTIME SETTINGS |
| &P.PGMPSF | EQU | 4 | .FORCE SIGN F |
| &P.PGMPSC | EQU | 8 | .FORCE SIGN C |
| | SPACE | | |
| &P.PGMFLAG1 | DS | CL1 | FLAG 1 |
| &P.PGMF1COCO | EQU | X'80' | .CONTAINS COPY CODE |
| &P.PGMF1CAGV | EQU | X'40' | .CLASS, ALL GUIDS VALID |
| &P.PGMF1TADE | EQU | X'20' | .REDEF TADE CALCULATED |
| &P.PGMF1TOOL | EQU | X'10' | .TOOL/UTILITY MODE |
| &P.PGMF1LGDV | EQU | X'08' | .GLOBAL SVB VALUES |
| &P.PGMF1LSVB | EQU | X'04' | .LOCAL SVB VALUES |
| &P.PGMF1PAX | EQU | X'02' | .PARAMETER X-ARRAY |
| &P.PGMF1BS4 | EQU | X'01' | .BREAK/STF 4 BYTE OFFSET |
| | SPACE | | |
| &P.PGMFLAG2 | DS | CL1 | FLAG 2 |
| &P.PGMF2PROF | EQU | X'80' | .PROFILER, HIDE OBJECT |
| | SPACE | | |
| &P.PGMNOCTYPE | DS | CL8 | TYPE OF NOCCODE |
| | SPACE | | |
| &P.PGMCOMPOPT | DS | 0CL4 | COMPILER OPTION (FINAL) |
| &P.PGMCOMPOPT1 | DS | CL1 | .EQUATES CAN BE FOUND IN NAMPR |
| &P.PGMCOMPOPT2 | DS | CL1 | . . . . |
| &P.PGMCOMPOPT3 | DS | CL1 | . . . . |
| &P.PGMCOMPOPT4 | DS | CL1 | . . . . |
| | SPACE | | |
| &P.PGMINSN | DS | F | # INSTANCE VARI (EVDT SLOTS) |
| &P.PGMINSOFF | DS | F | OFFSET 1ST INSTANCE VARI SLOT |
| &P.PGMABN | DS | F | # DYNAMIC ALPHA/BINARY |
| &P.PGMABOFF | DS | F | OFFSET 1ST DYN ALPHA/BIN SLOT |
| | SPACE | | |
| &P.PGMGUID | DS | CL36 | GUID |
| | SPACE | | |
| &P.PGMCOMPOPTI | DS | CL4 | COMPILER OPTIONS (INITIAL) |
| &P.PGMCOMPOPTM | DS | CL4 | COMPILER OPTIONS (MODIFIED) |
| | SPACE | | |

-continued

Program Listing

```
&P.SECTLENPGM      EQU   *-&P.PGMSECT TABLE ENTRY LENGTH V_BASE
                   SPACE
*-------------------------------------------------------------------------------
*        V82 EXTENSION
*-------------------------------------------------------------------------------
&P.PGMCOMPOPTX  DS    CL4            PART 2 COMPILER OPTIONS (FINAL)
&P.PGMCOMPOPTI2 DS    CL4            PART 2 COMPILER OPTIONS (INITIAL)
&P.PGMCOMPOPTM2 DS    CL4            PART 2 COMPILER OPTIONS (MODIFIED)
                SPACE
                DS    CL116          *** FREE
&P.SECTLENPGM82 EQU   *-&P.PGMSECT TABLE ENTRY LENGTH V82_00
                EJECT
.JS06    ANOP
         AIF      ('&SYM' NE 'YES') .JS09
         AIF      ('&TYPE' EQ 'DSECT') .JS07
&P.SYMSECT       DS    0A
         AGO      .JS08
.JS07    ANOP
&P.SYMSECT       DSECT
.JS08    ANOP
         SPACE
                 DS    0F             ALIGNMENT

&P.SECTLENSYM    EQU   *-&P.SYMSECT TABLE ENTRY LENGTH (SYT)
         EJECT
.JS09    ANOP
         AIF      ('&DDM' NE 'YES') .JS12
         AIF      ('&TYPE' EQ 'DSECT') .JS10
&P.DDMSECT       DS    0A
         AGO      .JS11
.JS10    ANOP
&P.DDMSECT       DSECT
.JS11    ANOP
         SPACE
&P.DDMSECT       DS    0A
&P.DDMDBID       DS    F              DBID
&P.DDMFNR        DS    F              FNR
         SPACE
                 DS    0F             ALIGNMENT
&P.SECTLENDDM    EQU   *-&P.DDMSECT TABLE ENTRY LENGTH (DDM)
         EJECT
.JS12    ANOP
         AIF      ('&TAB' NE 'YES') .JS15
         AIF      ('&TYPE' EQ 'DSECT') .JS13
&P.TABSECT       DS    0A
```

-continued

| Program Listing |
|---|

```
          AGO          .JS14
.JS13     ANOP
&P.TABSECT           DSECT
.JS14     ANOP
          SPACE
&P.TABNAME     DS    CL4          NAME
&P.TABTYPE     DS    F            TYPE
&P.TABOFF      DS    F            OFFSET
&P.TABLEN      DS    F            LENGTH
&P.SECTLENTAB  EQU   *-&P.TABSECT TABLE ENTRY LENGTH (TABLE)
          SPACE
          AIF        ('&EXE' NE 'YES') .JS16
*----------------------------------------------------------------
*         TABLES IN BUFFERPOOL
*----------------------------------------------------------------
&P.TABPMAX     EQU   33 + 7       *** MAX NUMBER TABLES
&P.TABPEMPTY   EQU   00           *** TABLE IS EMPTY
&P.TABPNOC     EQU   01           NOC CODE
&P.TABPWKF     EQU   02           WORK FILES
&P.TABPPRT     EQU   03           PRINTER
&P.TABPGDABLK  EQU   04           GDA BLOCKS
&P.TABPVDT     EQU   05           VARIABLE DESCRIPTION
&P.TABPIRST    EQU   06           INITIAL RESET
&P.TABPMPT     EQU   07           ADE/IDE TABLE
&P.TABPSBT     EQU   08           ACB/SEARCH
&P.TABPWKFNAME EQU   09           WORKFILE FIELD NAMES
&P.TABPDDMN    EQU   10           DDM NAMES
&P.TABPGPT     EQU   11           GENERATED PROGRAM
&P.TABPFOBU    EQU   12           FORMAT BUFFER
&P.TABPAIVNAME EQU   13           AIV/CONTEXT NAMES
&P.TABPSUBUSE  EQU   14           USED SUBROUTINES
&P.TABPGDS     EQU   15           GENERATED DEFINE STATEMENT
&P.TABPSQL     EQU   16           GENERATED SQL STATEMENTS
&P.TABPNOCOS   EQU   17           NOC OPTION STRING
&P.TABPHANDLE  EQU   18           HANDLES
&P.TABPCLASDEF EQU   19           CLASS DEFINITION TABLE
&P.TABPICLFAC  EQU   20           I_CLASS_FACTORY
&P.TABPINSTNC  EQU   21           INSTANCE MODEL
&P.TABPINSVAR  EQU   22           INSTANCE VARIABLES
&P.TABPINSNAM  EQU   23           INSTANCE VAR. NAMES
&P.TABPDYNSFC  EQU   24           DYNAMIC SYSTEM FUNCTIONS
&P.TABPSTATSF  EQU   25           STATIC SYSTEM FUNCTIONS
&P.TABPCOPA    EQU   26           CODE PAGE/IANA NAME
```

| | | | |
|---|---|---|---|
| Program Listing | | | |
| &P.TABPKST2CP | EQU | 27 | CODE PAGE/KST VALUES |
| &P.TABPXVDT | EQU | 28 | XVDT TEMPLATES |
| &P.TABPXAGD | EQU | 29 | X-ARRAY GROUP DEFINED |
| &P.TABPISUB | EQU | 30 | INTERNAL SUBROUTINE |
| &P.TABPXAGP | EQU | 31 | X-ARRAY GROUP PARAMETER |
| &P.TABPFUNC | EQU | 32 | FUNCTIONS |
| &P.TABPBISF | EQU | 33 | BUILT-IN SYSTEM FUNCTIONS |
| SPACE | | | |
| *--- | | | |
| * TABLES IN THREAD | | | |
| *--- | | | |
| &P.TABTMAX | EQU | 6 + 5 | *** MAX NUMBER TABLES |
| &P.TABTEMPTY | EQU | 0 | *** TABLE IS EMPTY |
| &P.TABTSFT | EQU | 1 | SYSTEM FUNCTIONS |
| &P.TABTBRT | EQU | 2 | BREAK |
| &P.TABTUPR | EQU | 3 | USED PRINTER |
| &P.TABTEVDT | EQU | 4 | EXTENDED VDT |
| &P.TABTKST | EQU | 5 | CONSTANTS/VARIABLES |
| &P.TABTHDX | EQU | 6 | HANDLE, DYNAM + X-ARRAY |
| SPACE | | | |
| *--- | | | |
| * TABLES ONLY AT RUNTIME | | | |
| *--- | | | |
| &P.TABRMAX | EQU | 6 + 4 | *** MAX NUMBER TABLES |
| &P.TABREMPTY | EQU | 0 | *** TABLE IS EMPTY |
| &P.TABRCIDS | EQU | 1 | COMMAND ID'S |
| &P.TABRDRIB | EQU | 2 | DUMMY RECORD/ISN BUFFER |
| &P.TABRTADE | EQU | 3 | TEMPORARY ADE'S |
| &P.TABRVARI | EQU | 4 | VARIABLES |
| &P.TABRSFTPA | EQU | 5 | PRINTER DEP. SFT ACCUMULATORS |
| &P.TABRTEMPF | EQU | 6 | TEMPORARY WORK FIELDS |
| SPACE | | | |
| *--- | | | |
| * MISCELLANEOUS TABLES | | | |
| *--- | | | |
| &P.TABMMAX | EQU | 1 + 5 | *** MAX NUMBER TABLES |
| &P.TABMEMPTY | EQU | 0 | *** TABLE IS EMPTY |
| &P.TABMINSDA | EQU | 1 | INSTANCE DATA |
| .JS16 ANOP | | | |
| ASPACE | | | |
| .JS15 ANOP | | | |
| .* MNOTE *,'NAMEXDIR ************ END *************' | | | |
| MEND | | | |

What is claimed is:

1. A method for transforming a third-generation language (3GL) and/or an Assembler program that is callable by a fourth-generation language (4GL) program so that the 3GL and/or Assembler program is executable upon call by the 4GL program and from within a 4GL runtime environment, the method comprising:
including a 4GL identifier in the executable of the 3GL and/or the Assembler program to facilitate execution of the 3GL and/or the Assembler program upon call of the fourth-generation language (4GL) program and within the 4GL runtime environment.

2. The method according to claim 1, wherein the identifier is a 4GL program header.

3. The method according to claim 2, wherein the 4GL is Natural.

4. The method according to claim 1, wherein the executable of the transformed 3GL and/or the Assembler program further comprises a relocation stub routine.

5. The method according to claim 4, further comprising checking whether a table of relocation dictionary (TRLD) exists in the executable.

6. The method according to claim 5, further comprising locking the 3GL and/or the Assembler program and relocating A- and/or V-constants in the TRLD.

7. The method according to claim 4, further comprising replacing the value of one or more unresolved V-constants using the relocation stub routine.

8. The method according to claim 1, wherein the transformed 3GL and/or Assembler programs are marked as 4GL executable code.

9. The method according to claim 1, further comprising modifying the call statement of a 4GL program that calls the transformed 3GL and/or Assembler program.

10. The method according to claim 1, further comprising preloading the transformed 3GL and/or Assembler program into a 4GL program cache.

11. The method according to claim 1, further comprising relocating the transformed 3GL and/or Assembler program in the 4GL program store area.

12. The method according to claim 1, wherein the 4GL identifier is a 4GL program header transforming the 3GL and/or Assembler program into a 4GL executable without modifying the 3GL and/or Assembler program.

13. The method according to claim 12, wherein the 4GL program header includes Natural Optimization Code parameters identifying the 3GL and/or Assembler program as Natural Optimization Code to be executed in the 4GL runtime environment.

14. The method according to claim 12, wherein the 4GL program header includes a flag identifying that the 3GL and/or Assembler program is executable in the 4GL runtime environment.

15. A non-transitory computer readable storage medium tangibly storing a computer program comprising instructions for performing the method of claim 1.

16. A system configured to transform a third-generation language (3GL) and/or an Assembler program that is callable by a fourth-generation language (4GL) program so that the 3GL and/or Assembler program is executable upon call by the 4GL program and from within a 4GL runtime environment, wherein the system comprises a processor operable to execute transformation logic configured to include a 4GL identifier in the executable of the 3GL and/or the Assembler program.

17. The system according to claim 16, wherein the runtime environment employs an underlying zIIP processor.

18. A method of executing a fourth-generation language (4GL) program on a computer, the method comprising:
   executing a call statement of the 4GL program that has been configured so that, in lieu of calling a third generation language (3GL) and/or an Assembler program, a transformed 3GL and/or Assembler program that includes logic of the 3GL and/or the Assembler program is instead called; and
   executing the transformed 3GL and/or Assembler program within a 4GL runtime environment without requiring a context switch to the 3GL and/or the Assembler program, or an environment thereof.

19. The method according to claim 18, further comprising loading the transformed 3GL and/or Assembler program into the 4GL program cache memory.

20. The method according to claim 18, wherein the transformed 3GL and/or Assembler program comprises:
   a 4GL identifier;
   relocation code and a table of relocation dictionary; and
   3GL records that comprise executable code of the 3GL and/or the Assembler program.

21. The method according to claim 18, wherein the transformed 3GL and/or Assembler program comprises pseudo operation code that facilitates execution of the transformed 3GL and/or Assembler program by a compiler of the 4GL program.

22. The method according to claim 18, wherein the transformed 3GL and/or Assembler program further comprises a relocation stub routine.

23. The method according to claim 22, wherein the relocation stub routine is configured to replace a value of one or more unresolved V-constants.

\* \* \* \* \*